United States Patent [19]
Furneaux et al.

[11] Patent Number: 5,715,926
[45] Date of Patent: Feb. 10, 1998

[54] MONEY VALIDATION

[75] Inventors: David Michael Furneaux, Reading; Stephen John Dillon, Boxford; Paul Franklin Steel, Wokingham, all of United Kingdom

[73] Assignee: Mars, Incorporated, McLean, Va.

[21] Appl. No.: 553,381

[22] PCT Filed: Mar. 9, 1995

[86] PCT No.: PCT/GB95/00511

§ 371 Date: Feb. 12, 1996

§ 102(e) Date: Feb. 12, 1996

[87] PCT Pub. No.: WO95/24697

PCT Pub. Date: Sep. 14, 1995

[30] Foreign Application Priority Data

Mar. 11, 1994 [GB] United Kingdom ............. 9404823

[51] Int. Cl.[6] ............................................. G07D 5/08
[52] U.S. Cl. ................................................. 194/317
[58] Field of Search ................................. 194/317, 318, 194/319

[56] References Cited

U.S. PATENT DOCUMENTS

| 4,349,095 | 9/1982 | Lewis . |
| 5,236,071 | 8/1993 | Lee ........................... 194/317 |

FOREIGN PATENT DOCUMENTS

| 2564981 | 11/1985 | France . |
| 2619235 | 2/1989 | France . |
| 2092798 | 8/1982 | United Kingdom . |
| 2266399 | 10/1993 | United Kingdom . |

*Primary Examiner*—F. J. Bartuska
*Attorney, Agent, or Firm*—Fish & Richardson P.C.

[57] ABSTRACT

Apparatus for validating items of value is described. The apparatus includes a measurement circuit including an inductor, the complex impedance of which varies in accordance with the interaction between a test item of value and a magnetic field within which the inductor is located. Circuitry is provided for extracting first and second periodic signals from the measurement circuit, and a circuit is provided for timing the interval between corresponding portions of the first and second periodic signals. A processing element then determines the value of a parameter related to at least one of the real and imaginary parts of said complex impedance, as a measure of the validity of said test item, from the outputs of the timing circuit.

20 Claims, 11 Drawing Sheets

5,715,926

1
MONEY VALIDATION

FIELD OF THE INVENTION

This invention relates to a method of, and apparatus for, validating items of money (or like items of value); particularly, but not exclusively, to validating coins.

BACKGROUND OF THE INVENTION

It is known to validate items of money using an inductive sensor affected by an electromagnetic field, by measuring the effects on the sensor of a coin interacting with the field. The sensor may comprise a coil, and the field may be generated by the sensor coil or by another coil close thereto.

It is known to utilise measurements of the real and imaginary (i.e. the resistive and inductive) components of the inductance of the sensor as a basis for validating items of money; as described, for example, in U.S. Pat. No. 5,048,662 or U.S. Pat. No. 4,946,019.

In coin testing apparatus, as is generally known, a coin is subjected to one or more tests by passing it along a pathway in which it enters an oscillating magnetic field produced by an inductor, and measuring the degree of interaction between the coin and the field, the resulting measurement being dependent upon one or more characteristics of the coin. The resulting measurement is then processed (for example compared) with reference data, or each of a set of reference data, corresponding to the measurement obtained from one or more denominations of acceptable coin. It is common to apply more than one such test, the respective tests being responsive to respective different coin characteristics, and to judge the tested coin acceptable only if all the test results are appropriate to a single, acceptable, denomination of coin. An example of such apparatus is described in GB-A-2093620.

Our earlier application GB-A-2254948, and corresponding U.S. Pat. No. 5,213,190, describe a technique which is particularly useful for coin validation. In this technique, a measurement which is primarily sensitive to the coin material is derived by measuring the angle of displacement, in the impedance plane (that is, the plane in Which the reactive impedance and the resistive impedance of a circuit or inductor are represented as measurements or vectors along two mutually perpendicular axes in that plane), of the impedance as a coin passes through the field.

SUMMARY OF THE INVENTION

An object of the present invention is to provide an improved method and apparatus for making impedance plane measurements of a coin.

Another object of the invention is to provide a method and apparatus for impedance plane measurements of a coin using relatively simple and inexpensive hardware to provide an accurate result.

The present invention provides, in one aspect, a method of validating items of money using parameters relating to the real and/or imaginary components of impedance of an inductor affected by the interaction between a magnetic field and the item of money, by measuring the phase of the inductor output using a timer circuit.

In particular, two timing measurements are taken from different parts of the circuit including the inductor, and are combined to derive the real and imaginary components of impedance. Thus, digital timing circuitry may be employed to accurately measure both components of complex impedance, without requiring extensive analogue circuitry for amplitude, frequency or phase measurement.

2

Other aspects and preferred embodiments of the invention will be apparent from the following description and claims.

The invention will now be described, by way of example only, with reference to the accompanying drawings.

DETAILED DESCRIPTION

Figure 1:
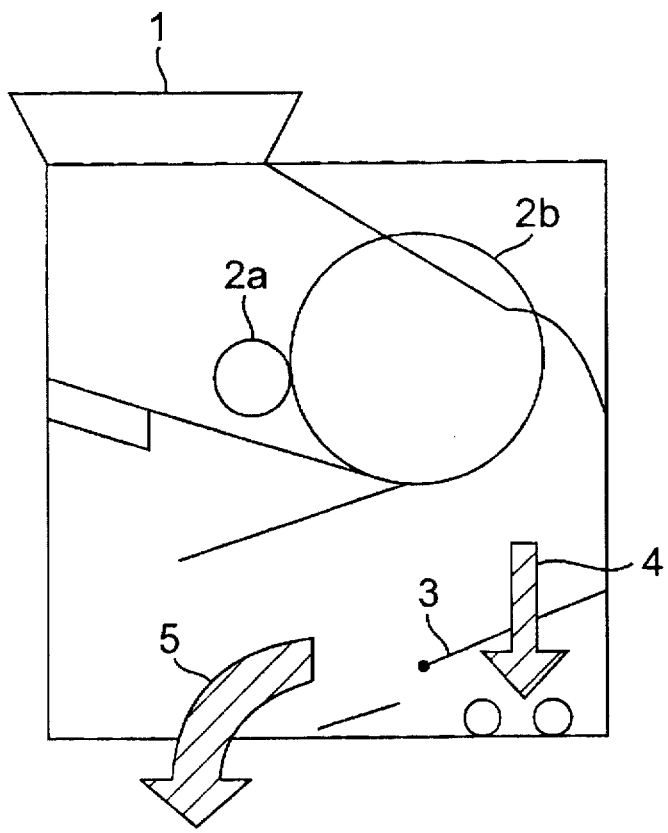
FIG. 1 is a schematic vertical section through a coin validator.

Referring to FIG. 1, a coin enters through an inlet 1 and rolls past, for example, two inductive coil sensors 2a, 2b (e.g. a thickness sensing coil 2a and a diameter sensing coil 2b). In dependence upon the sensor outputs, an accept gate 3 is controlled to either direct the coin on an accept path 4 or a reject path 5. Where multiple denominations can be recognised, further gates are provided to selectively route an accepted coin in accordance with its denomination to one of a plurality of different stores.

Figure 2:
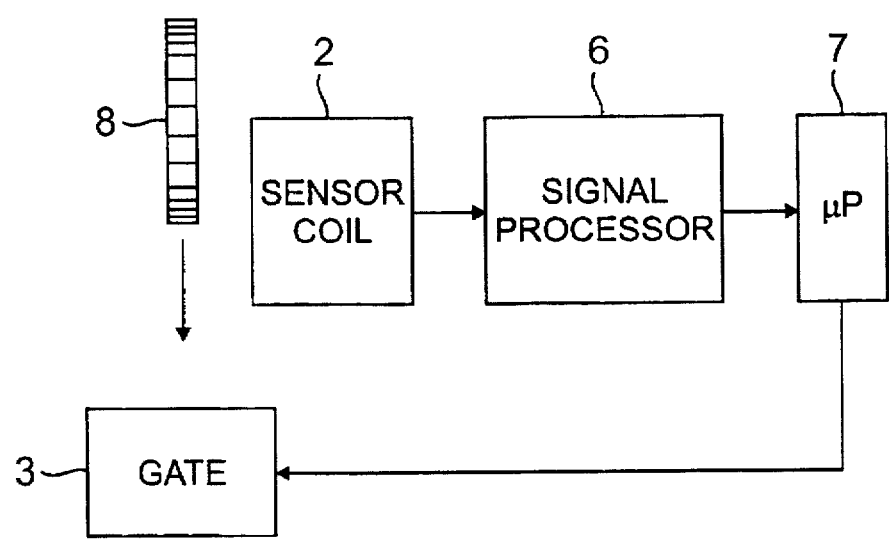
FIG. 2 is a schematic block diagram indicating the electrical arrangement of a money validator according to an embodiment of the present invention.

Referring to FIG. 2, the signal from the or each sensor coil 2, as a coin 8 passes the coil 2, is processed by a signal processing circuit 6 to extract measurement signals, on the basis of which a decision circuit 7 (for example, a microprocessor or microcontroller circuit) generates a control signal to actuate the gate 3 to accept or reject the coin, and generates a corresponding signal where a coin is accepted, to enable the apparatus (for example, vending machine) with which the coin validator is provided.

Figure 3:
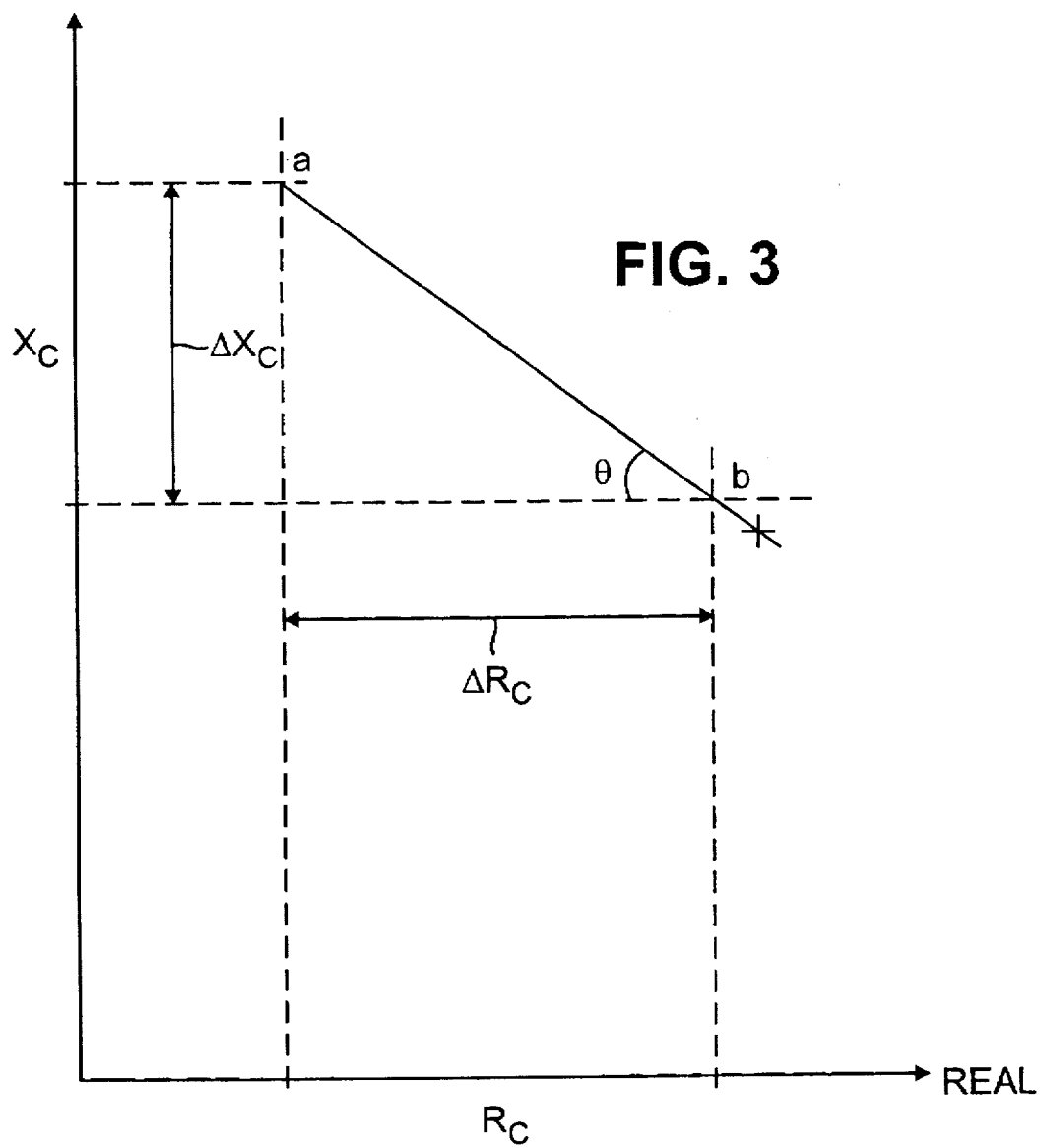
FIG. 3 is an impedance plane diagram.

Referring to FIG. 3, as a coin 8 passes the sensor coil 2, the complex impedance of the coil 2 changes. In FIG. 3, the vertical axis represents the reactive component $X_c$ of impedance and the horizontal axis represents the resistive component $R_c$ of impedance. The complex impedance of the coil 2 when no coin is present is shown as a point a. When a coin is in proximity to the coil 2, both the effective reactance and the effective loss of the coil will change; that is to-say that when X and R are now measured, the resulting values will define a different point b in the impedance plane. As noted in our above referenced earlier application and U.S. patent, the length of displacement along the line a-b varies depending upon the distance of the coil from the coin, but the angle $\theta(=\tan^{-1}(\Delta X_c/\Delta R_c))$ is representative of the properties of the coin.

In our above described application and U.S. patent, generally some analog signals are generated from which the magnitudes of the real and imaginary components of impedance can be derived, and these are digitised for processing by a microprocessor.

In the present invention, on the other hand, the real end imaginary components of impedance are found by phase measurement, more particularly by digital timing circuitry.

Figure 6:
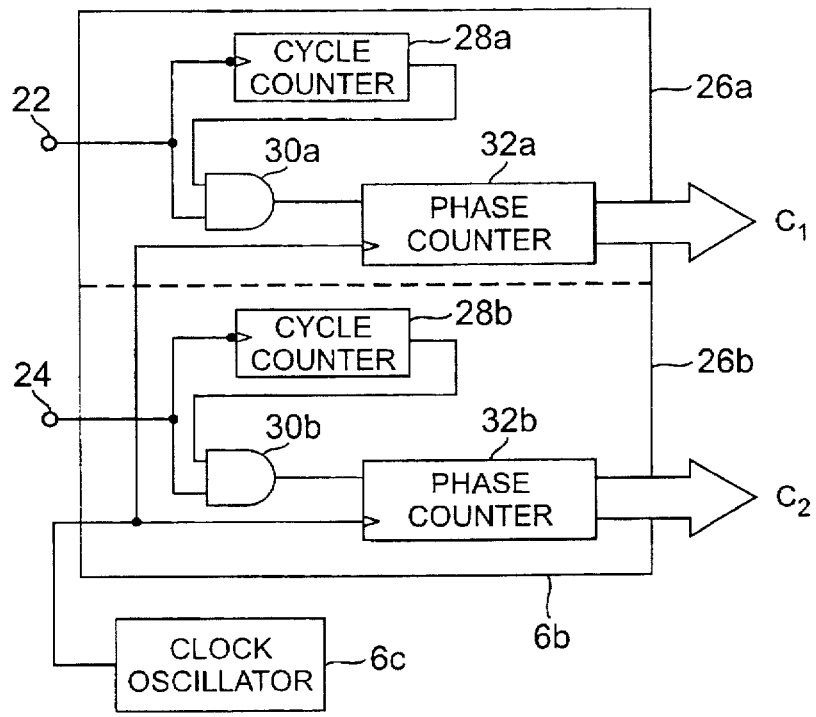
FIG. 6 is a block diagram showing in greater detail the structure of a counter circuit forming part of the signal processing circuit shown in the embodiment of FIG. 2.

In the first embodiment, the signal processing circuit 6 comprises a phase comparison section 6a (shown in FIG. 4) and a timing section 6b, 6c (shown in FIG. 6).

Figure 4:
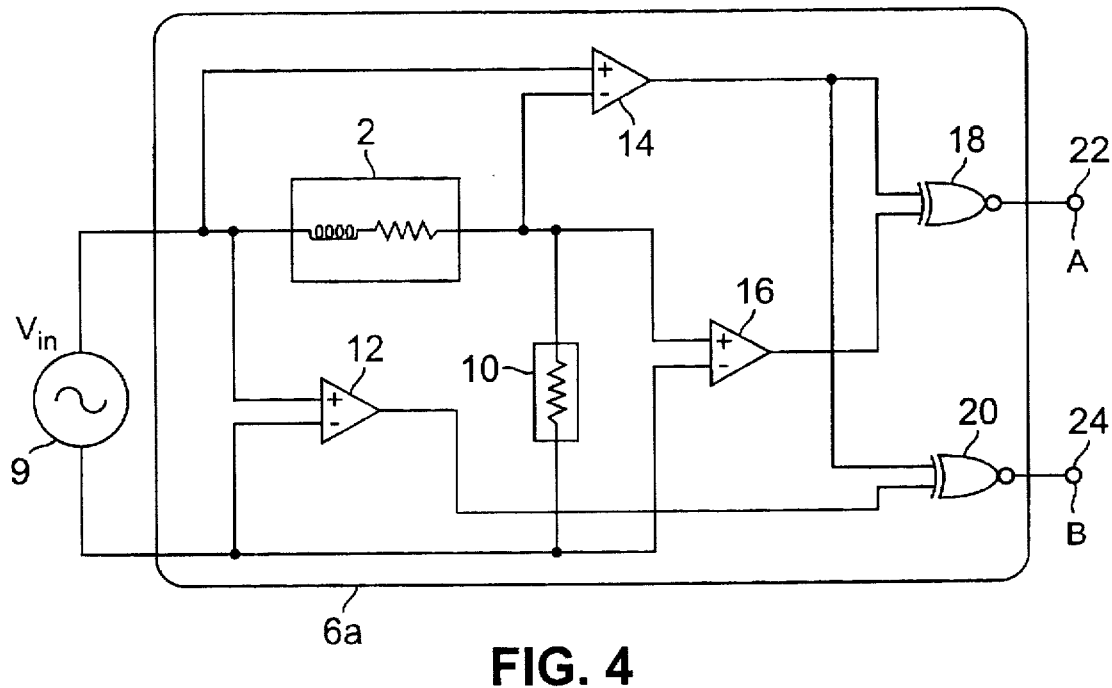
FIG. 4 is a block diagram showing in greater detail a part of a signal processing circuit forming part of the embodiment of FIG. 2.

Referring to FIG. 4, an inductive coil 2 is energised by a sinusoidal waveform generator 9 generating a voltage $V_{in}$. The coil 2 is in series with a resistor 10 having an accurately characterised resistance R. The currents through the coil 2 and resistor 10 are sinusoidal and in the same phase. The current lags the energising voltage $V_{in}$ generated by the generator 9 by a phase angle which depends upon the reactance X of the coil 2, relative to the magnitude of the resistance R of the resistor 10 and the resistance $R_c$ of the coil 2.

Figure 5:
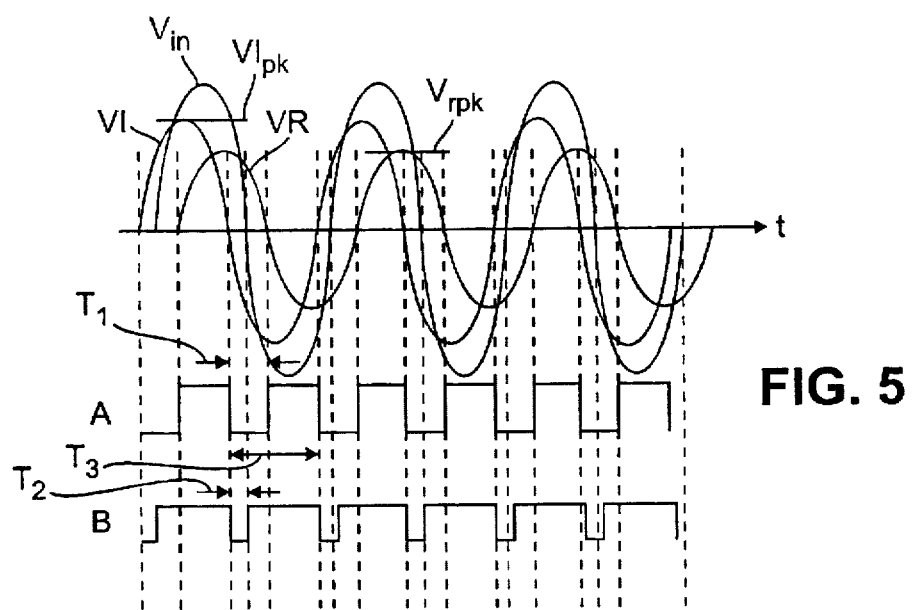
FIG. 5 is a timing diagram showing the voltages at various points of the circuit of FIG. 4 over time.

As shown in FIG. 5, the voltage $V_r$ over the resistor 10 is in phase with the current through the resistor 10 and consequently lags the input voltage $V_{in}$ by the same phase angle.

The voltage across the coil 2 is the sum of the voltage due to the resistance of the coil $R_c$ which is in phase with the voltage $V_r$ across the resistor 10 and the voltage due to the reactance of the coil, which lags the current through the coil 2 (and hence the voltage $V_r$ across the resistor 10) by 90°. The voltage across the coil 2, $V_1$ thus lags the voltage $V_r$ across the resistor 10 as shown in FIG. 5, by an amount which depends upon the relative magnitudes of the inductance and resistance of the coil 2, and the resistance of the resistor 10. The input voltage $V_{in}$ generated by the generator 9 is equal, at any moment, to the sum of the voltages $V_r$ and $V_1$ as shown in FIG. 5.

Referring once more to FIG. 4, the energising voltage $V_{in}$ generated by the generator 9 is sampled by a first comparator 12, which consequently generates a square wave signal of the same frequency as the energising voltage $V_{in}$, and with edges at the zero crossing points of $V_{in}$.

The voltage over the coil 2 is likewise sampled by a comparator 14, which likewise generates a square wave signal of the same frequency, and with edges at the zero crossing points of the voltage $V_1$ over the coil 2. The voltage of the resistor 10 is sampled by a third comparator 16, to generate a third square wave signal with edges at the zero crossings of the voltage $V_r$ over the resistor 10. The comparator outputs thus do not depend significantly upon the magnitude (or variations in the magnitude) of the voltage generated by the generator 9.

A pair of exclusive-not-or (XNOR) gates 18, 20 are provided. The first exclusive XNOR gate 18 accepts the output of the comparator 14 and the output of the comparator 16 as inputs, and generates an output signal A at node 22. The second gate 20 accepts as inputs the outputs of the comparators 14 and 12, and generates an output signal B at a node 24.

Thus, the output of signal A of the gate 18 is high when the outputs of the comparators 14 and 16 are in the same state (either high or low), and is low when they are in different states (i.e. one is high and the other is low).

Similarly, the output signal B of the gate 20 is high when the outputs of the comparators 12, 14 are in the-same state and low when they are in different states.

Thus, as shown in FIG. 5, the signals A and B are both rectangular and have pulses at twice the frequency of the energising voltage $V_{in}$ generated by the generator 9. In FIG. 5 the interval $T_3$ corresponds to one period of the signal A, and is equal to half the period of the sinusoidal voltages $V_1$, $V_{in}$ and $V_r$. The period $T_1$ which separates adjacent pulses of the signal A corresponds to the time delay between the voltage $V_1$ over the coil 2 and the voltage $V_r$ over the resistor 10. The time period $T_2$ between adjacent pulses of the signal B corresponds to the time delay between the voltage $V_1$ over the coil 2 and the voltage $V_{in}$ supplied by the generator 9.

Referring to FIG. 6, the nodes 22, 24 are connected to the timing section 6b, which comprises a first counter section 26a and a second counter section 26b. Each counter section 26a, 26b comprises a cycle counter 28a, 28b triggered by a positive going edge on the signals A and B, and generating a high output until a predetermined number of following positive going edges have been counted. The outputs of the cycle counters 28a, 28b are fed to first input terminals of a respective logic gate 30a, 30b, and the incoming signals A, B are connected to the other input terminals of the gates 30a, 30b, the outputs of which are connected to the counting inputs of respective phase counters 32a, 32b each clocked from a high speed clock oscillator 6c.

Figure 7:
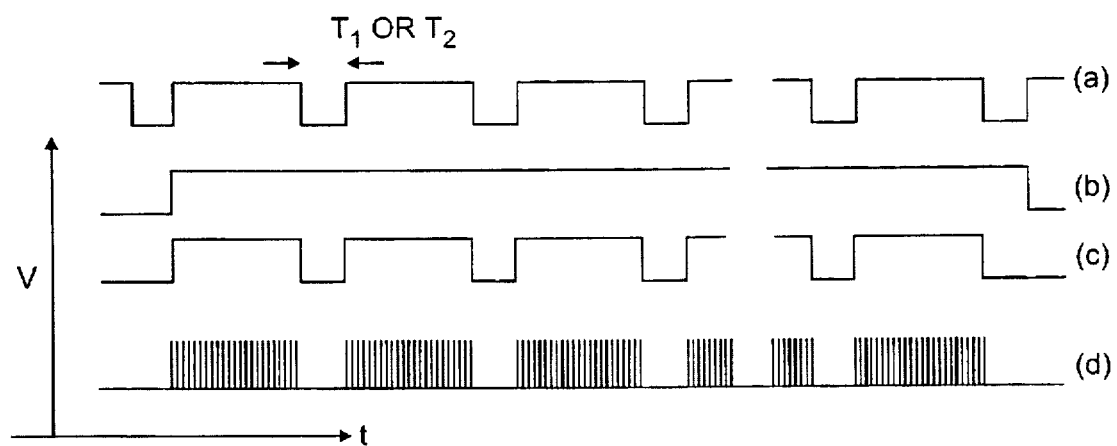
FIG. 7 is a timing diagram showing the voltages of various signals over time in the circuit of FIG. 6.

Thus, where a waveform shown in FIG. 7a is received at one of the input terminals 22 or 24, the cycle counter 28a generates the positive gating waveform shown in FIG. 7b for a predetermined number of cycles of the input waveform shown in FIG. 7a. Whilst the output (FIG. 7b) of the cycle counter 28a is high, successive pulses in the waveform of FIG. 7a will cause the gate circuit 30a or 30b to generate a high output as shown in FIG. 7c, which enables the phase counter 32a or 32b to count successive clock pulses from the clock circuit 6c over the duration of the pulses separating successive intervals $T_1$ or $T_2$ as shown in FIG. 7d.

Thus, after the end of the predetermined number of cycles, the count in each of the phase counters 32a, 32b represents the total of the widths of all the pulses over the predetermined number of cycles, and hence the output of the phase counter 32a is representative of the average of the periods $T_1$ and the output of the phase counter 32b is representative of the average of the periods $T_2$.

Rather than being proportional to $T_1$ and $T_2$, the outputs of the phase counters 32a, 32b (hereinafter designated $C_1$ and $C_2$) are proportional to $(T_3-T_1)$ and $(T_3-T_2)$, for reasons discussed below. It would, of course, be straightforward to make the counts proportional to $T_1$ and $T_2$, by making gates 30a, 30b as exclusive OR gates.

The manner in which the outputs of the phase counters 32a and 32b are utilised by the processor 7 will now be described.

The phase angle α between the voltage $V_1$ over the coil 2 and the voltage $V_r$ across the resistor 10 is readily derived from the time lag $T_1$ between the two, as follows:

$$\alpha = 180 \times T_1/T_3$$

Likewise, the phase angle β by which the voltage $V_1$ over the coil 2 lags the generator voltage $V_{in}$ is given by:

$$\beta = 180 \times T_2/T_3$$

The instantaneous voltage over the coil is given by:
$V_1 = V_{1pk} \sin[wt]$ and likewise the voltage $V_r$ across the resistor 10 is given by:

$$V_{rpk} \sin[wt - \alpha].$$

The peak current through the coil 2 and the resistor 10 is given by $I_{1pk} = V_{rpk}/R$, according to Ohms law.

At phase angle $wt = \beta$, $V_{in} = 0$ and hence $V_1 + V_r = 0$.
Thus, $V_{1pk} \sin[\beta] = -V_{rpk} \sin(\beta - \alpha)$.
Thus, $V_{1pk} \sin[\beta] = -RI_{1pk} \sin(\beta - \alpha)$.
The impedance Z of the coil 2 is given by:

$$Z = V_{1pk}/I_{1pk} = -R \sin(\beta - \alpha)/\sin(\beta)$$

Since α is the phase of the complex impedance vector Z, the resistive part of the coil impedance $R_c$ is given by Z cos α, and the inductive or reactive component X is given by Z sin α, in other words:

$$R_c = R \sin(\alpha - \beta) \cos(\alpha)/\sin(\beta) \quad (1)$$

$$X_c = R \sin(\alpha - \beta) \sin(\alpha)/\sin(\beta) \quad (2)$$

Thus, starting from the time measurements $T_1$ and $T_2$, and a knowledge of the resistance R of the resistor 10, the resistive and inductive components of the coil impedance can be derived. The period $T_3$ is also known, since this is a fixed property of the generator 9 in this embodiment.

Accordingly, in one embodiment, illustrated in FIG. 8, the processor is arranged to receive the counts $C_1$ and $C_2$ from the phase counters 32a, 32b and subtract them from a value proportional to $T_3$ to obtain $T_1$ and $T_2$ in a step 101; calculate α and β in a step 102; calculate sin α, cos α, sin β and sin (α-β) in a step 103; and calculate $R_c$ and $X_c$ in a step 104.

Figure 8A:
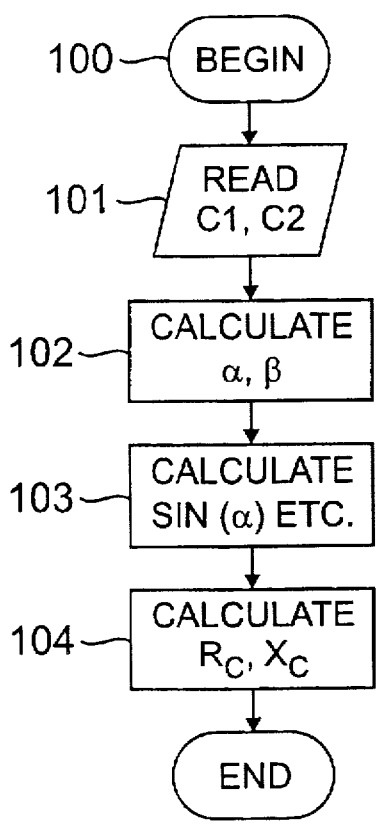
FIG. 8a is a flow diagram indicating the operation of a processor circuit forming part of the embodiment of FIG. 2 in a first embodiment.
Figure 8B:
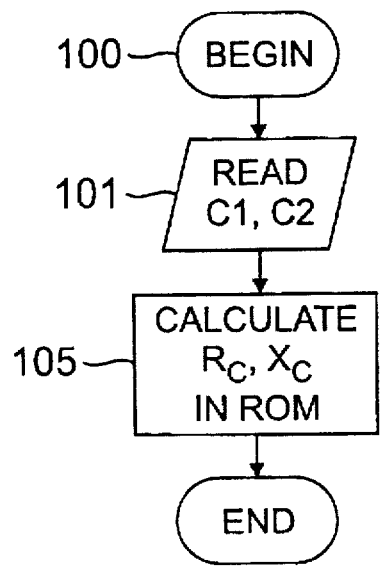
FIG. 8b is a flow diagram indicating the operation of a processor circuit forming part of the embodiment of FIG. 2 in a second embodiment.

Alternatively, as shown in FIG. 8b, in another embodiment the processor is arranged to read $C_1$ and $C_2$ as above, and to use the values of $C_1$ and $C_2$ jointly as an address input to a lookup table storing all values of the function sin (180 $[C_1-C_2]/T_3$) cos (180$[T_3_1-C_1]/T_3$) R/sin (180$[T_3-C_2]/T_3$), and sin (180$[C_2-C_1]/T_3$) sin (180 $[T_3-C_1]/T_3$) R/sin (180 $T_2/T_3$), stored in for example a read only memory (ROM), and use the results as $R_c$ and $X_c$, in a step 105.

In one practical example, preferred details of the above embodiment are as follows. If the coil 2 is a thickness sensing coil (2a of FIG. 1) it may be driven at 7.99 kHz with a sinusoidal voltage $V_{in}$ by the generator 9. The cycle counters 28a, 28b are arranged to open the gates 30a, 30b over sixteen voltage cycles (equivalent to thirty-two high pulses in the waveforms A, B), giving a measurement acquisition time of 2 milliseconds in total.

The frequency of the clock 6c is preferably as high as possible. Ideally, the clock 6c would run at over 100 MHz, so as to give several hundred counts within each of the periods $T_1$, $T_2$. Mowever, speeds of this order are difficult to achieve. Accordingly, the clock 6c in this embodiment operates at a frequency which is not harmonised or synchronised with the waveform $V_{in}$ generated by the generator 9 (e.g. at 29.49 MHz). Thus, cumulating the counts over several cycles increases the resolution of the measurement.

Furthermore, in this embodiment, the operation of counting during periods when the signals A and B are high to give $(T_3-T_1)$ and $(T_3-T_2)$ increases the accuracy somewhat further, since for the signal B the period $T_2$ corresponds to a phase of around 45° so that the period $T_2$ occupies about 25% of each half cycle. By counting during the remaining 75% of each half cycle, the accuracy of the count $C_2$ is higher than the accuracy which would have been attained by counting $T_2$.

Figure 9:
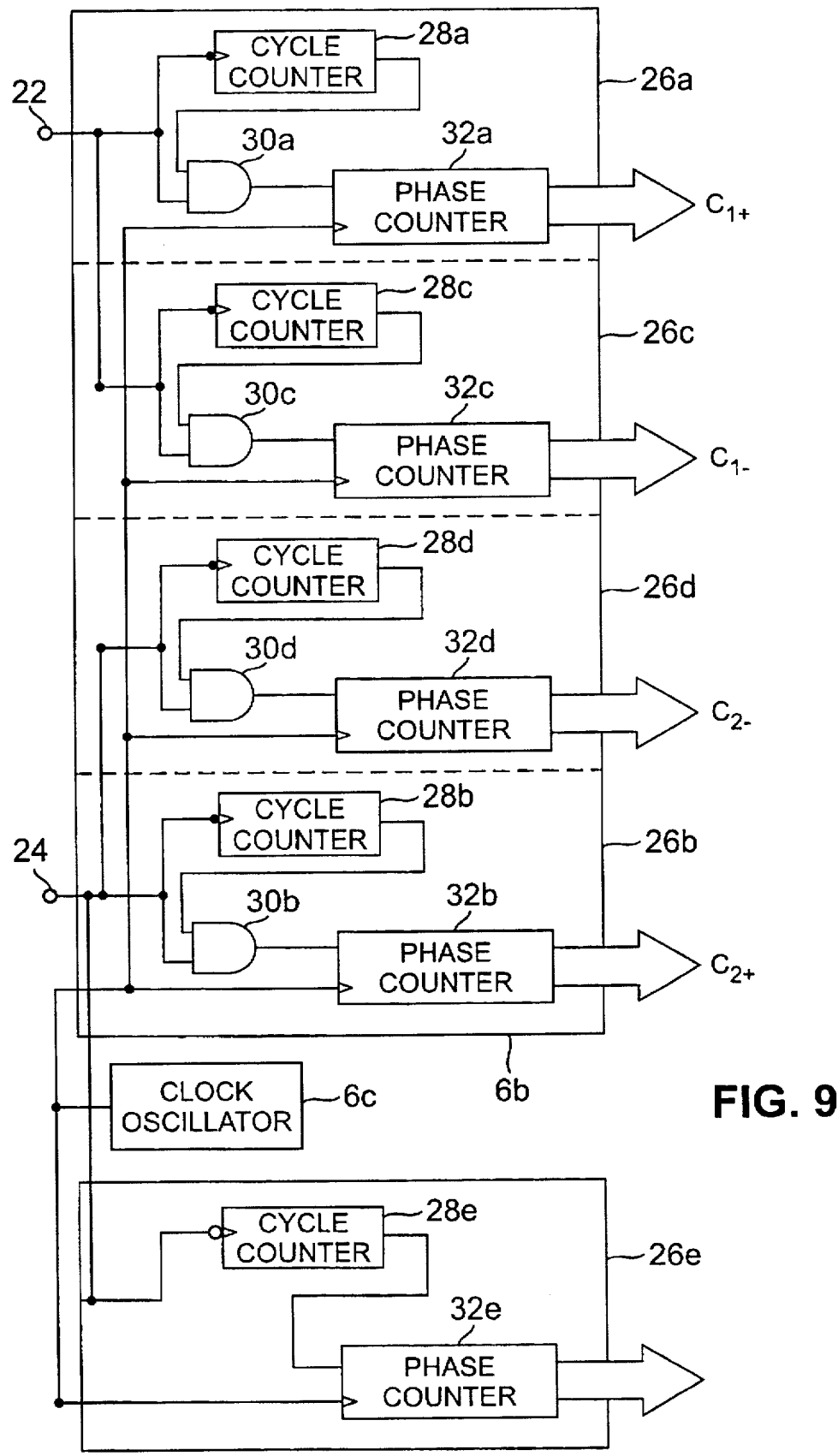
FIG. 9 corresponds to FIG. 6 and illustrates the structure of a counter circuit in a third embodiment.

Referring to FIG. 9, in a further and preferred embodiment, an additional pair of counting sections 26c, 26d are provided. The counting section 26c is connected in parallel with, and is generally the same as, the counting section 26a; and the counting section 26d is likewise connected in parallel with the counting section 26b; except that the counting sections 26a, 26b (as in the above embodiment) are arranged to increment on positive going edges of the signal from the clock 6c, and the counting sections 26c and 26d are arranged to increment on negative going edges. Thus, the accuracy can be doubled without increasing the clock speed by adding the outputs of the counters 26a, 26c and the counters 26d and 26b, and the processor 7 in this embodiment is arranged to do so.

Also provided in this embodiment is a fifth counting section 26e arranged to count the total number of clock pulses over the acquisition period of 2 milliseconds.

Figure 10:
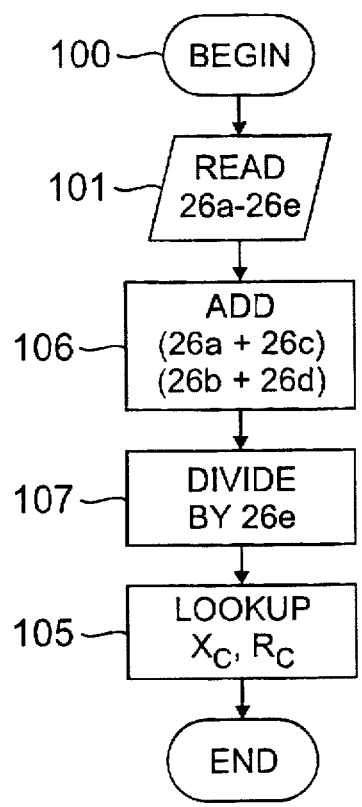
FIG. 10 is a flow diagram corresponding to FIG. 8b illustrating the operation of the processor circuit in the third embodiment.

As shown in FIG. 10, in this embodiment, the processor 7 is arranged to read all five outputs of the counting section 6b, in step 101; to add the counts of the counters 26a and 26c and those of the counters 26b and 26d in a step 106; and to divide the two sums thus derived by the output of the counting section 26e in a step 107, prior to looking up the values of the coil inductance and resistance as above.

This step reduces the effect of any errors which may be caused by variations in the frequency of the clock 6c.

Figure 11:
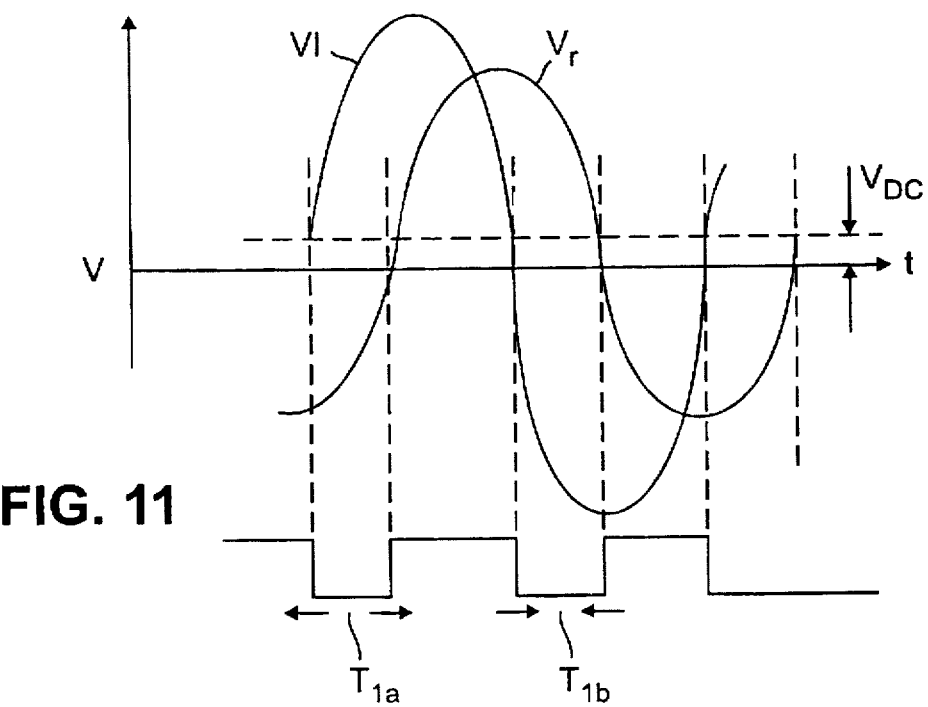
FIG. 11 is a timing diagram corresponding to FIG. 5 and illustrating the effect of a D.C. offset in the operation of the invention.

Referring to FIG. 11, the superimposition of a DC voltage in the circuit including the coil 2 is illustrated. The effect of this is to increase the width of alternate intervals $T_{1a}$ between pulses in the signal A from the XNOR gate 18. However, although the width of the intervals $T_{1a}$ is increased, there is a corresponding decrease in the width of intervening pulses $T_{1b}$. When, as in the above embodiments, the phase counters 32 count over one or more whole voltage cycles, a superimposed DC error thus has a reduced effect on the accuracy of the invention.

Figure 12:
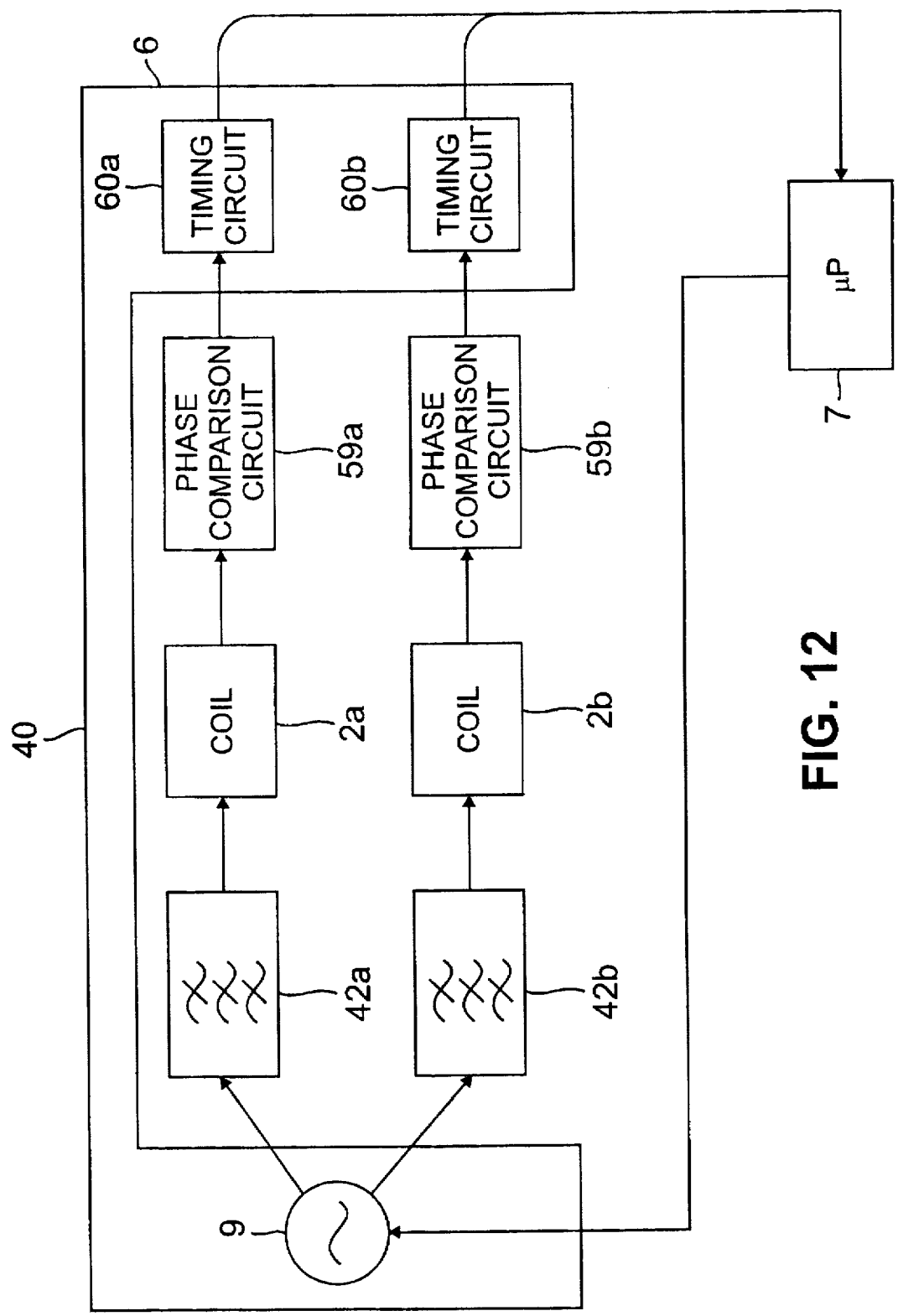
FIG. 12 is a block diagram showing schematically the structure of a fourth embodiment of the invention.

Referring to FIG. 12, in a preferred embodiment both the thickness sensing coil 2a and the diameter sensing coil 2b are connected, as shown in FIG. 12, to respective phase comparison circuits 59a, 59b, each corresponding to the phase comparison section 6a shown in FIG. 4, the outputs of which are connected to timing circuits 60a, 60b each corresponding to the timing section 6b shown in FIG. 6 or FIG. 9. In a preferred construction, discussed in greater detail below, a single signal generator 9 is provided, together with the timing circuits 60a, 60b, as an Application Specific Integrated circuit. (ASIC). The output of the signal generator circuit 9 is connected to each of the coils 2a, 2b via a respective filter 42a, 42b. The filter 42a is generally low pass, having a cut-off frequency of around 8 kHz, and the filter 42b has a corresponding cut-off frequency of around 110 kHz. Within each filter 42a, 42b is a d.c. blocking capacitor for removing d.c. offsets. The capacitor in the filter 42b is selected furthermore to attenuate signals at frequencies around 8 kHz and upwards (but not above a cut off frequency well below 110 kHz).

The signal generator 9 is controlled by the processor 7 to alternately generate a signal at 7.99 kHz for energising the thickness sensing coil 2a, and a signal at 111.8 kHz for energising the diameter sensing coil 2b.

The processor 7 likewise reads the corresponding outputs of the signal processing circuit 60a, 60b in sequence.

Figure 13:
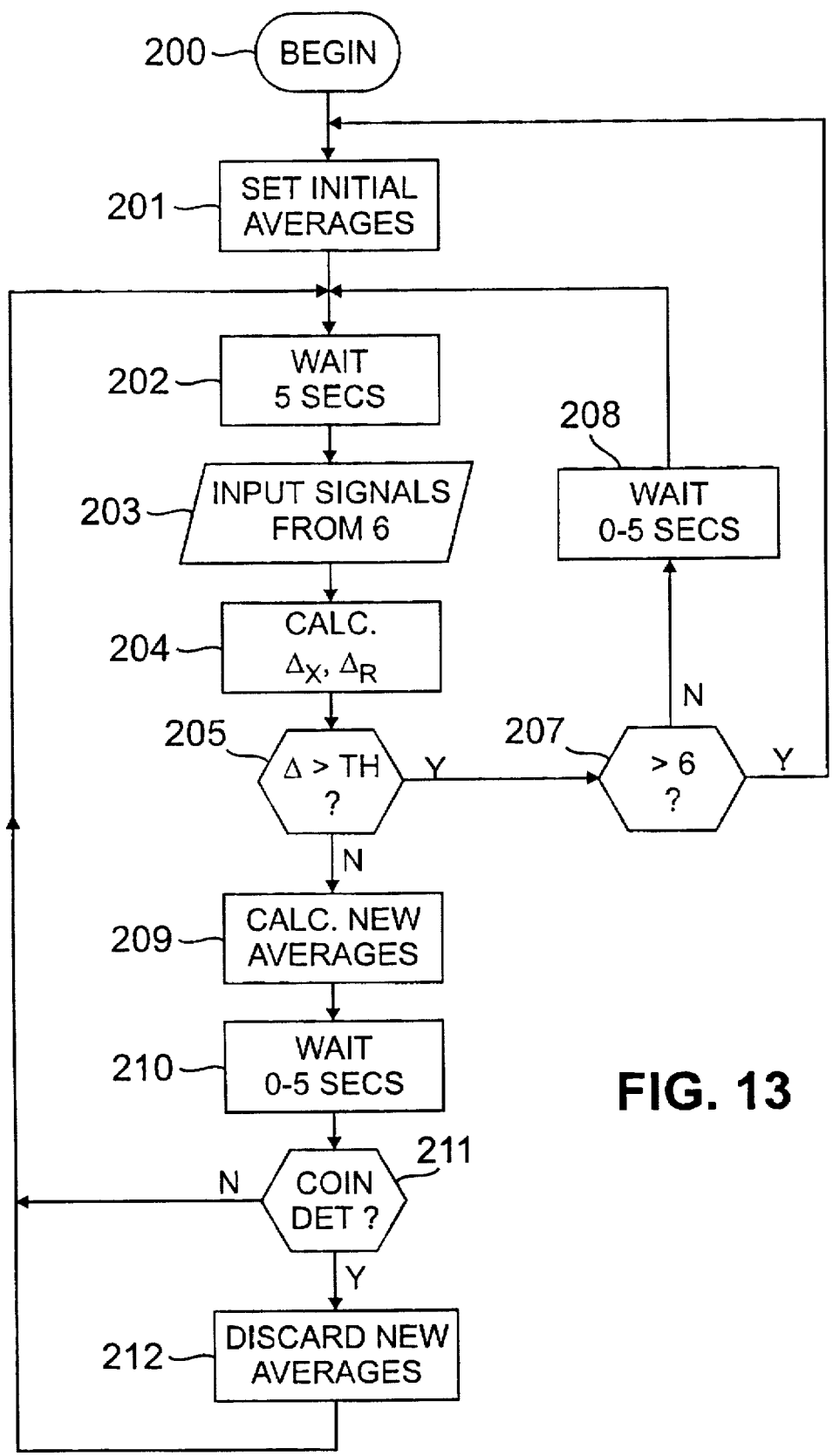
FIG. 13 is a flow diagram illustrating the operation of the processor circuit in measuring rest levels of signals in the embodiment of FIG. 12.

Referring to FIG. 13, the general operation of the processor 7 will now be described.

In general terms, the processor 7 is operable in three phases.

In a first phase, the processor is operable to measure the rest values (i.e. without a coin being present) of the coil impedance and inductance ($R_{av}, X_{av}$). The rest value is periodically updated to maintain a running average rest value, so as to take account of changes in the values of circuit components due to, for example, temperature or other ambient conditions.

In a second phase, the processor 7 is arranged to detect the arrival of a coin.

Once coin arrival is detected, the processor 7 is operable in a third phase to locate the peak values of coil resistance and inductance shift from the rest values ($\Delta R, \Delta X$), and to calculate, from these peak values (which do not necessarily occur at the same time), the value of the ratio ($\Delta X/\Delta R$) between the two (herein referred to as the impedance plane angle or IPA), for reasons disclosed in our above-referenced earlier U.S. patent.

Referring to FIG. 13, after power-up in a step 200, initial values for the average coil inductance and resistance X,R are set (201) in a special mode in which, for example, eight successive readings are taken from the signal processor circuits 60a, 60b and the resulting values calculated for R and X (as described below) are averaged to form mean R and X values, which are then stored in writable memory (e.g. RAM) in the processor 7.

Next, in step 202, the processor waits 5 seconds, and then reads the two count values from the signal processor circuit 60a and the two count values from the signal processor circuit 60b in a step 203.

Next, from the count values, the processor 7 calculates (step 204) values for $R_c$ and $X_c$ as disclosed above in equations 1 and 2. Then, the changes $\Delta R$, $\Delta X$ in resistive and reactive components are found by subtracting from the just calculated values the corresponding averages $R_{av}$, $X_{av}$ (which will initially be those calculated in the initial step 201).

Next, in a step 205, the changes $\Delta R, \Delta X$ are tested against predetermined respective thresholds. If either of the respective thresholds is exceeded, the readings are not used to recalculate the average. values $R_{av}, X_{av}$. If six successive readings show deviations above the predetermined thresholds (207), the current average values $R_{av}$, $X_{av}$ are discarded, and the initial average setting process of step 201 is re-executed. If not, after a 0.5 second wait in step 208, the process recommences at step 202.

If neither component of .impedance exceeds the respective predetermined threshold, then the average values $R_{av}$, $X_{av}$ are recalculated in a step 209 to give two new values $R_{new}$, $X_{new}$, for example using the exponentially weighted moving average process described in our earlier application EP-A-0480736 (agents ref J.25100 EP) on page 31 thereof, or by a corresponding process of multiplying each existing stored average value by 3; adding the corresponding just calculated value; and dividing the total by 4 to form the new average.

The processor 7 then waits 0.5 seconds in a step 210, and if a coin has been detected in the meantime (as discussed below) the just-calculated new values $R_{new}$, $X_{new}$ are discarded and the previous average values are maintained, in a step 212; otherwise, the new values are accepted and stored as the averages $R_{av}$, $X_{av}$ and the processor 7 reverts to step 202.

Figure 14:
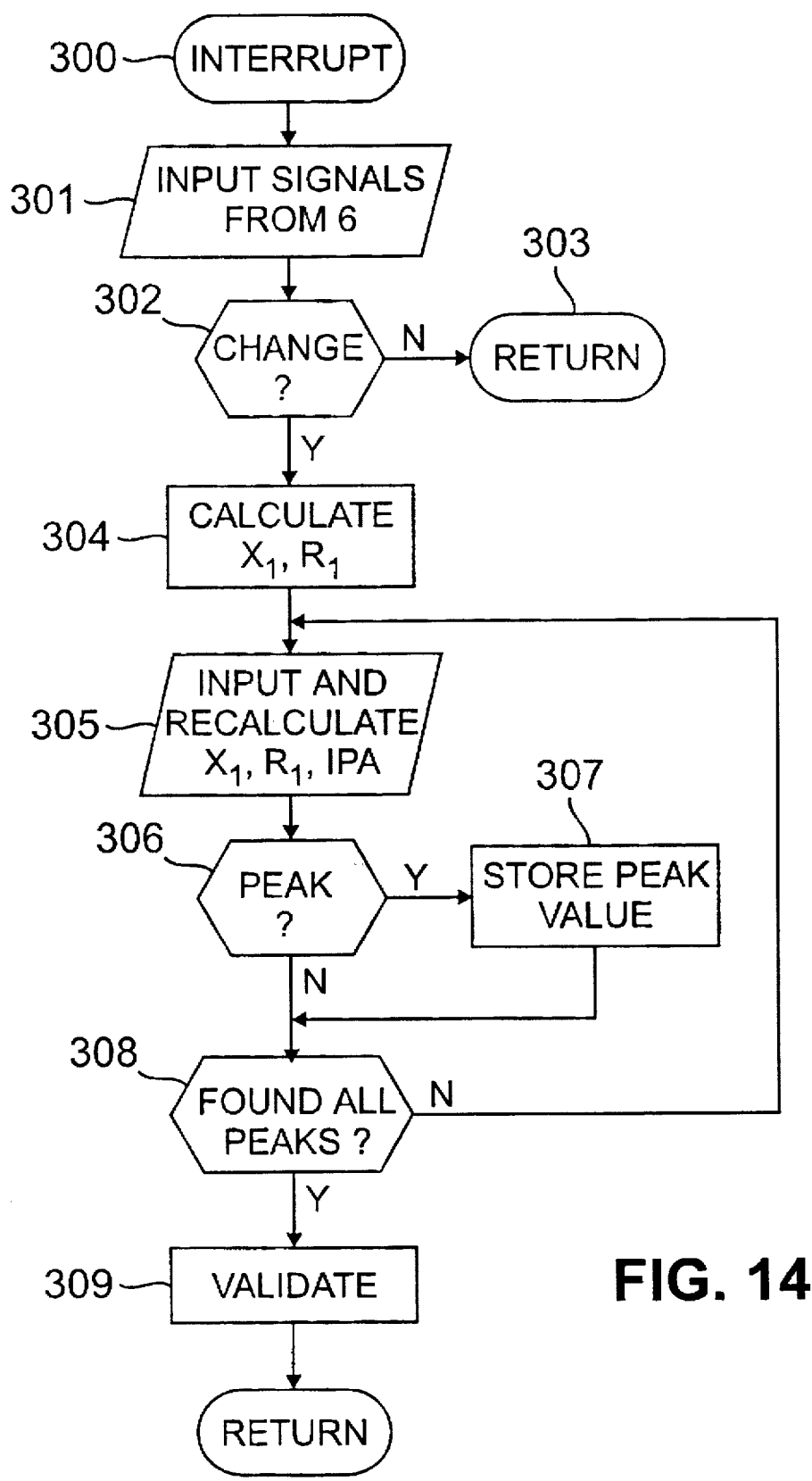
FIG. 14 is a flow diagram illustrating the operation of the processor circuit in detecting coin arrival and validating a coin in the embodiment of FIG. 12.

Referring to FIG. 14, the above process of FIG. 13 is periodically interrupted to test for the arrival of a coin. At each interruption (300), the processor 7 reads the counts from the signal processing circuit 60a in a step 301. In a step 302, the processor tests whether a coin may have arrived; in this embodiment, by testing the $C_1$ counts from the signal processing circuit 60a. If the value of the $C_1$ count from the material/thickness coil 2a has changed in excess of a predetermined threshold from the previously read value thereof, arrival of a coin is possible; if not, the interruption is ended and the processor returns in a step 303.

The time $T_1$ ($T_1=T_3-C_1$) is found to closely approximate the resistive impedance of the coil 2a, and hence changes in the value of $C_1$ are a good indicator of changes in the value of resistance of the coil, although the indication is not exact enough to be used where accurate discrimination is required. It is preferred to observe changes in the resistive component of coil impedance to indicate coin arrival, because the resistive component of impedance always increases with the arrival of a coin regardless of the material of the coin; on the other hand, the reactive component of impedance, which is closely linked to the count $C_2$, increases with the arrival of a non-magnetic coin but decreases with the arrival of a magnetic (e.g. ferromagnetic) coin.

Otherwise, further tests for coin arrival are preferably carried out; for example by calculating (step 304) the resistive and reactive components ($R_c$, $X_c$) of coil impedance and examining the change in these since the previous reading.

Where a coin arrival is detected, the processor 7 proceeds to take further inputs from the processing circuits 60, 60b (step 305) and calculate corresponding real and imaginary impedance components and impedance plane angle (IPA) using one of the processes of FIGS. 8a, 8b or 10. The processor 7 then detects peak-values of $X_c$, $R_c$ and IPA in a step 306, by repeatedly calculating the change dR, dX, dIPA between each just-calculated value and the respective previously calculated value. When the sign of the change dR, dX or dIPA alters, the peak (maximum or minimum) value is determined to be present and is stored (step 307).

The processor then uses one or more of $\Delta R_c$, $\Delta X_c$ or IPA to validate the coin in known fashion (step 309); for example by comparing each of the $\Delta R_c$, $\Delta X_c$ and IPA values for each of the coils 2a, 2b with predetermined stored thresholds defining windows as taught in our UK patent no. 1452740 or by utilising non-rectangular acceptance boundaries as taught in our earlier applications EP-A-0496754 or GB-A-2254949 or EP-A-0480736; (agents refs J.25077 EP, J25106 GB, J25100 EP).

When a coin is validated, the processor 7 actuates the gate 3 to accept the coin.

In addition to the direct utilisation of the calculated $\Delta R_c$, $\Delta X_c$ and IPA measurements in validating a coin, the processor 7 may calculate a measure of ambient temperature from the outputs of the signal processor 6. For example, the average coil resistive impedance $R_{av}$ may be utilised as a measure of ambient temperature, as it is found to increase linearly with temperature. As noted above, the values $T_1$ or $C_1$ are closely related to the resistive impedance of the coil, and hence one of these could be used as a monotonic (though non-linear) indication of temperature. This temperature-measure may then be utilised to correct other coin validation parameters.

Figure 15:
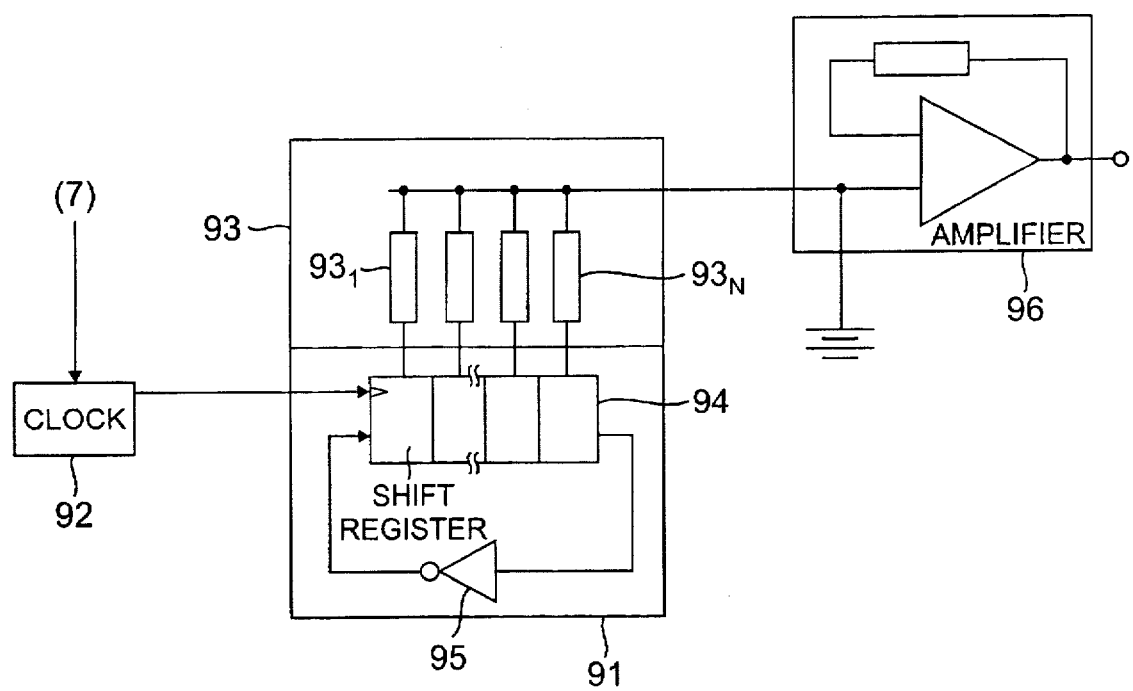
FIG. 15 is a block diagram illustrating a signal generator circuit which may form part of the embodiment of FIG. 12.

Referring to FIG. 15, in one embodiment the signal generator 9 comprises a free running digital counter circuit 91 driven from a clock 92, the output of which is connected through a resistance network 93. The counter circuit 91 comprises a shift register 94 (for example including 8 cells), the output of which is connected, via a NOT gate 95, to its input. The N stages of the shift register are each connected, via a resistor $93_1$–$93_N$ to a common input terminal of an amplifier 96 at which a DC level is added. Starting with all cells containing logic 0, as the shift register 94 is clocked, the content of each cell in turn (from the input end) is switched to logic 1 until all cells contain logic 1; after which the content of each cell (from the input end) is progressively switched back, The values of the resistors $93_1$–$93_N$ are unequal, and are suitably selected to generate an approximate sine wave.

The output of the signal generator 9 is thus a stepped sinewave at a frequency proportional to that of the clock 92, which is selected not to be a harmonic of the clock 6c.

Although a digital timer device has been described for timing the durations of the signals A, B, in other embodiments the timing means for timing these signals may involve some analog measurement. This enables the improvement of the resolution of measurement of time.

In the above described embodiments, when the signals A or B are measured using a digital counter timer device, the measurement is accurate to only one clock count. Some improvement in accuracy is obtained by taking measurements over multiple cycles, but this improvement is only proportional to the square root of the number of cycles taken.

In one embodiment, a Miller integrator circuit comprising an operational amplifier including a capacitor in its feedback path is provided and, during the period over which the signal is to be timed, a constant voltage is provided at the input thereof. Thus, the integrator output ramps upwards linearly, to reach a voltage dependent on the duration of the signal interval being measured.

After each interval to be measured, the input voltage is removed until the next interval to be measured. Thus, between measurement intervals, the output of the integrator remains at a constant level, from which it begins to ramp again in the next period to be measured.

Thus, after a predetermined number of intervals have been measured, the output of the integrator represents the sum of the time intervals measured, and is accurate to a level determined by the analog components, without depending upon dither or quantisation noise from a counter. The accuracy is therefore proportional to the number of intervals over which the measurements are averaged, rather than to the square root thereof.

The output of the integrator at the end of the measurement period can be measured using either an analog to digital converter, or a counter; in the latter case, the counter times the period until the output of the integrator reaches zero when a predetermined discharging voltage is applied to the input of the integrator.

The range over which the integrator is required to be linear may be reduced by altering this arrangement to provide for regular periodic discharging of the integrator at a predetermined rate, so as to maintain the integrator output within a predetermined band, and by counting the number of occasions on which the integrator was discharged (which is therefore equivalent to the time duration to discharge the integrator in the above-described arrangement). Again, in this embodiment, the integrator output is held constant in between the periods being measured, so as to maintain a fractional count value in analog form.

Other analog arrangements are equally possible; for example, a sawtooth generator comprising an integrator which is reset when its output reaches a predetermined level could be provided, the input to the integrator being zero in between measurement cycles, and the number of occasions on which the integrator output reaches the threshold being counted by a digital counter.

In all of these arrangements, therefore; at most one digital counter is required and the measurement accuracy is increased linearly with the number of periods over which measurements are integrated (rather than increasing with the square root of the number as in the above described wholly digital embodiments).

This technique could also be used for other types of phase timing or phase measurement circuitry than those described in the above embodiments, and is therefore usable independently of other aspects of the present invention.

It will be apparent from the foregoing that the above method and apparatus for deriving signals related to real and imaginary components of the impedance of an inductor for testing money is particularly useful in apparatus such as that described in our earlier U.S. Pat. No. 5,213,190, in which the angle of the locus of the complex impedance in the impedance plane is utilised to validate an item of money. However, the method according to the present invention may also be used in other apparatus which utilises impedance plane measurements (for example, in the apparatus disclosed in DE-A-2646025).

Whilst the above embodiments concern validating coins, it will be understood that the invention is also applicable to validating banknotes, or other articles of value (for example pre-formatted cheques or credit cards) which include magnetic material portions.

It is also possible that the invention could be applied to measurements other than measurements of items of money.

The above described method and apparatus for generating a signal are not limited in their application to the above described method and apparatus for validating items of money, but could also be used in other applications where it is desired to generate an approximate sinewave signal, or other type of signal, and to be able to vary the frequency of the signal.

It will equally be apparent that the above embodiments are merely illustrative of the invention, and that many substitutions or alternative constructions could be employed without departing from the invention. Furthermore according to the normal laws of arithmetic the mathematical expressions described in the above embodiments may be replaced with alternative expressions achieving the same or similar results.

We claim:

1. Apparatus for validating items of value comprising a measurement circuit including an inductor, the complex impedance of which varies in accordance with the interaction between a test item of value and a magnetic field within which the inductor is located; a time measurement circuit for measuring the interval between corresponding portions of first and second concurrent periodic signals from different points in the measurement circuit; and a processing circuit arranged to determine the value of a parameter related to at least one of the real and imaginary parts of said complex impedance, as a measure of the validity of said test item, from the outputs of the time measurement circuit.

2. Apparatus according to claim 1 in which the corresponding portions comprise zero crossings, and further comprising zero crossing detectors (12, 14, 16) responsive, respectively, to the first and second periodic signals, the time measurement circuit being responsive to the zero crossing detectors (12, 14, 16).

3. Apparatus according to claim 1 in which the time measurement circuit (6b) is arranged to time over at least one complete period of the first and second periodic signals.

4. Apparatus according to claim 3 in which the time measurement circuit (6b) is arranged to time over a plurality of such periods.

5. Apparatus according to claim 1 comprising first and second said inductors (2a, 2b).

6. Apparatus according to claim 5 in which the two inductors (2a, 2b) are energised at different frequencies.

7. Apparatus according to claim 5 further comprising a periodic signal generator (9) for selectively driving one of the inductors (2a; 2b), and means for controlling the generator to alternately drive the inductors (2a, 2b) in a sequence.

8. Apparatus according to claim 1 further comprising a reference impedance element (10).

9. Apparatus according to claim 8 in which the reference impedance element is a resistor (10).

10. Apparatus according to claim 1, in which the time measurement circuit (6b) is responsive to a third periodic signal from the circuit.

11. Apparatus according to claim 10 in which the third periodic signal relates to an energising signal supplied to the measurement circuit.

12. Apparatus according to claim 1 in which the time measurement circuit (6b) comprises a digital clock counter circuit (26).

13. Apparatus according to claim 1 in which the time measurement circuit comprises an analogue integrator circuit.

14. A method of validating items of value comprising the steps of providing a measurement circuit which includes an inductor (2) within a periodically alternating magnetic field, and determining the value of a parameter related to at least one of the real and imaginary parts of the complex impedance of the inductor (2) whilst an item of value (8) interacts with the magnetic field, and further comprising deriving first and second periodic signals from points in the measurement circuit, and timing said periodic signals to determine, relative to a reference phase, the phase thereof.

15. A method according to claim 14 comprising measuring the time interval between corresponding portions of the first and second signals.

16. A method according to claim 15, comprising timing intervals between zero crossings of said first and second signals.

17. A method according to claim 14 in which the interval between corresponding portions of a first voltage ($V_1$) over the inductor (2), and a second voltage ($V_r$) over a reference impedance element (10), are timed.

18. A method according to claim 17 in which intervals between respective portions of said first voltage ($V_1$) and corresponding portions of an energising signal ($V_{in}$) energising said inductor (2) and reference impedance element (10) are timed.

19. A method of deriving parameters related to at least one of the real and imaginary parts of the complex impedance of an inductor (2), said inductor being provided in a circuit with a reference impedance element (10) and energised by a periodic energising voltage ($V_{in}$), the method comprising the steps of:

a) deriving a first timing measurement from corresponding portions of a first voltage ($V_1$) over the inductor (2) and a second voltage ($V_r$) over the reference impedance element (10) and in a predetermined relation to the current through the inductor (2);

b) deriving a second timing measurement from corresponding portions of said first or second voltage ($V_1$; $V_r$) and the energising voltage ($V_{in}$); and c) utilising said first and second timing measurements to derive at least one parameter related to at least one of the real and imaginary parts of said complex impedance.

20. A method of measurement of complex impedance or phase parameters, comprising the steps of measuring the duration of a predetermined period of an alternating signal in a first cycle;

measuring the corresponding length of a corresponding period in at least one further cycle; and combining the two measurements to increase the accuracy thereof;

further comprising the step of storing an analog value related to the first measurement over the period between the first and second measurements.

\* \* \* \* \*